(12) United States Patent
Greiner et al.

(10) Patent No.: US 8,572,357 B2
(45) Date of Patent: *Oct. 29, 2013

(54) MONITORING EVENTS AND INCREMENTING COUNTERS ASSOCIATED THEREWITH ABSENT TAKING AN INTERRUPT

(75) Inventors: Dan Greiner, San Jose, CA (US); James H. Mulder, Wappingers Falls, NY (US); Robert R. Rogers, Beacon, NY (US); Robert W. StJohn, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1065 days.

This patent is subject to a terminal disclaimer.

(21) Appl. No.: 12/568,748

(22) Filed: Sep. 29, 2009

(65) Prior Publication Data

US 2011/0078421 A1 Mar. 31, 2011

(51) Int. Cl.
*G06F 9/00* (2006.01)
(52) U.S. Cl.
USPC ............ 712/227; 712/226; 712/244; 171/130
(58) Field of Classification Search
USPC .......................... 712/226, 227, 244; 717/130
See application file for complete search history.

(56) References Cited

U.S. PATENT DOCUMENTS

| | | | |
|---|---|---|---|
| 5,485,574 A | 1/1996 | Bolosky et al. | |
| 5,564,015 A * | 10/1996 | Bunnell | 714/47.2 |
| 5,875,294 A * | 2/1999 | Roth et al. | 714/39 |
| 6,654,934 B1 * | 11/2003 | Nemecek et al. | 326/38 |
| 6,708,296 B1 | 3/2004 | Gover et al. | |
| 2002/0065646 A1 * | 5/2002 | Waldie et al. | 703/26 |
| 2003/0036883 A1 | 2/2003 | Mericas | |
| 2005/0081101 A1 | 4/2005 | Love et al. | |
| 2007/0214302 A1 | 9/2007 | Kubo et al. | |
| 2007/0271441 A1 * | 11/2007 | Shaw et al. | 712/41 |
| 2012/0198216 A1 | 8/2012 | Greiner et al. | |

FOREIGN PATENT DOCUMENTS

EP 1860567 A1 11/2007

OTHER PUBLICATIONS

Communication Pursuant to Article 94(e) EPC for GB 10 763 639.1-1960, dated Mar. 12, 2013, 6 pages.
Office Action for U.S. Appl. No. 13/446,733 dated Oct. 15, 2012, 19 pages.
Browne et al.; "A Scalable Cross-Platform Infrastructure for Application Performance Tuning Using Hardware Counters"; ACM/IEEE; Nov. 2000, 13 pages.
Argolo et al.; "COTSon: Infrastructure for Full System Simulator"; ACM Digital Library; Jan. 2009, pp. 52-61.
IBM; "Temporal Thresholding Using Rewind Counter"; IP.Com; IBM TDB; Jan. 19, 2009, 3 pages.
International Search Report and Written Opinion for PCT/EP2010/063952 dated Feb. 2, 2011, 10 pages.
"z/Architecture—Principles of Operation," IBM Publication No. SA22-7832-07, Feb. 2009, 1344 pages.

* cited by examiner

*Primary Examiner* — David J Huisman
(74) *Attorney, Agent, or Firm* — John E. Campbell; Blanche E. Schiller, Esq.; Heslin Rothenberg Farley & Mesiti P.C.

(57) ABSTRACT

A monitoring facility that is operable in two modes allowing compatibility with prior existing monitoring facilities. In one mode, in response to encountering a monitored event, an interrupt is generated. In another mode, in response to encountering a monitored event, one or more associated counters are incremented without causing an interrupt.

20 Claims, 5 Drawing Sheets

MONITORING EVENTS AND INCREMENTING COUNTERS ASSOCIATED THEREWITH ABSENT TAKING AN INTERRUPT

BACKGROUND

This invention relates, in general, to processing within a computing environment, and in particular, to monitoring events that occur during processing.

Over the years, different monitoring tools have been used to monitor processing events. One such tool is a Monitor Call (MC) instruction used for monitoring processing within z/Architecture® systems, offered by International Business Machines Corporation. The Monitor Call instruction provides programs with the ability to monitor key areas of interest, which are represented by monitor classes and monitor masks. The monitor masks allow the control program (e.g., operating system) to enable one or more of sixteen possible monitor classes. When a Monitor Call instruction is executed that specifies an enabled monitor class (i.e., mask bit for specified class is set), a monitor event program interruption occurs, and the control program can record information based on a monitor code specified in the instruction. When a Monitor Call instruction is executed, but the specified monitor class does not correspond to an enabled monitor mask bit, the instruction acts as a no-operation (NOP).

The Monitor Call instruction is used, for instance, to count the executions of instrumented code paths. The counting is performed using a Count program. The Count program has been used for years to determine the frequency of various key operating system events, including, as examples, supervisor calls (SVCs), locking, interruptions, storage allocation and release, scheduling, enqueuing and dequeuing, and so forth.

BRIEF SUMMARY

Counting operations using the prior existing Monitor Call mechanism require a substantial amount of overhead including taking a program interruption, establishing a recovery environment, performing the counting operation, and then reversing the process before returning to the interrupted program.

In accordance with an aspect of the present invention, an enhanced monitoring facility is provided that allows processor firmware (e.g., millicode) to efficiently update counters specified by the Monitor Call instruction without requiring an interrupt. The enhanced monitoring facility provides enhanced functionality that is compatible with prior existing functionality.

The shortcomings of the prior art are overcome and additional advantages are provided through the provision of a computer program product for facilitating monitoring within a computing environment. The computer program product comprises a storage medium readable by a processing circuit and storing instructions for execution by the processing circuit for performing a method. The method includes, for instance, executing a machine instruction to monitor an event of the computing environment, the executing includes specifying, by the machine instruction, the event to be monitored; and incrementing a counter associated with the event being monitored absent taking an interrupt.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, an enhanced monitoring facility is provided, which allows monitoring to be performed without causing an interrupt. This enhanced facility is compatible with the prior existing monitoring facility, in that depending on the setting of certain fields, either the prior existing monitoring facility is selected that causes interrupts (a first mode of operation), or the enhanced facility of the present invention is selected that does not cause interrupts (a second mode of operation). Although an interrupt is not taken with the enhanced facility, monitoring is performed that provides, for instance, counts of events.

Figure 1:
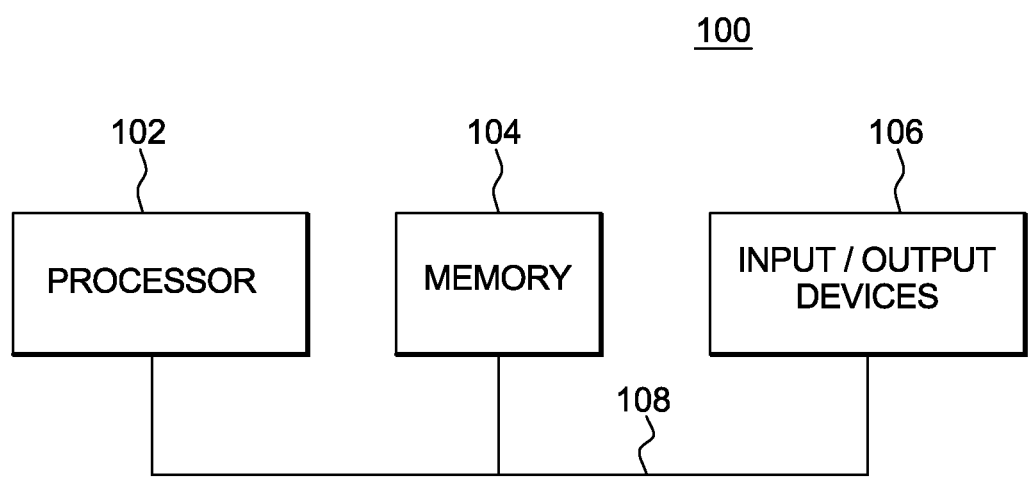
FIG. 1 depicts one example of a computing environment to incorporate and use one or more aspects of the present invention.

One embodiment of a computing environment to incorporate and use one or more aspects of the present invention is described with reference to FIG. 1. Computing environment 100 includes, for instance, at least one processor 102 (e.g., central processing unit (CPU)), a memory 104 (e.g., main memory) and one or more input/output devices 106 coupled to one another via, for example, one or more buses 108 or other connections.

As one example, computing environment 100 is based on the z/Architecture® offered by International Business Machines Corporation, an example of which is described in "z/Architecture-Principles of Operation," SA22-7832-07, February 2009, which is hereby incorporated herein by reference in its entirety. In this example, processor 102 is an eServer z/Series® server offered by International Business Machines Corporation, and it executes an operating system, such as the z/OS® operating system, also offered by International Business Machines Corporation. z/Architecture®, z/Series®, z/OS® and IBM® are registered trademarks of International Business Machines Corporation, Armonk, N.Y., U.S.A. Other names used herein may be registered trademarks, trademarks or product names of International Business Machines Corporation or other companies.

Processing within computing environment 100 is monitored via a monitoring facility, in accordance with an aspect of the present invention. The monitoring facility includes, for instance, a Monitor Call instruction that enables an action to be taken when selected points are reached in a program being monitored. That is, the Monitor Call instruction is implanted at desired points in the monitored program, and when those points are reached, action is taken. As examples, the action includes passing control to a monitoring program via an interrupt or, in accordance with an aspect of the present invention, updating one or more counts without taking an interrupt. The monitoring is useful in performing various measurement functions. For example, tracing information can be generated indicating which programs were executed, counting information can be generated indicating how often particular programs were used, and timing information can be generated indicating the amount of time a particular program required execution.

One example of a Monitor Call instruction is described with reference to FIG. 2. In this particular example, the Monitor Call instruction is part of the z/Architecture®, and aspects of the instruction that existed prior to the present invention are described in "z/Architecture-Principles of Operation," SA22-7832-07, February 2009, which is hereby incorporated herein by reference in its entirety. Although this particular example is provided, many variations to the format of the Monitor Call instruction are possible and are considered a part of the claimed invention.

Figure 2:
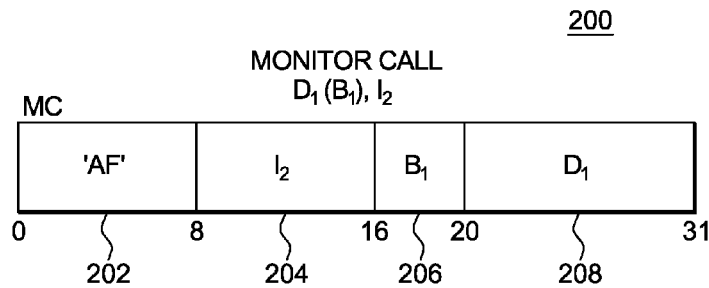
FIG. 2 depicts one example of the format of a Monitor Call instruction used in accordance with an aspect of the present invention.

Referring to FIG. 2, in one example, a Monitor Call instruction 200 includes an 8-bit operation code 202 (e.g., 'AF') that specifies the Monitor Call instruction; an index field ($I_2$) 204, which includes, for instance, a 4-bit unsigned binary number specifying one of 16 monitoring classes; and a first operand address designated by $B_1$ 206 and $D_1$ 208, which forms a monitor code used as described below. In this example, $B_1$ is 4 bits in length and $D_1$ is 12 bits in length. $B_1$ is a register location when $B_1$ is not equal to 0 whose contents are added to the $D_1$ field to produce an operand address, where the operand address is not used to address an operand, but to provide a monitor code.

When a Monitor Call instruction is reached in a program, the instruction is executed. During execution, at least one set of monitor masks is checked to determine if a monitor event is to be performed. The at least one set of masks is included in a control register, such as control register (CR) 8. In particular, in this example, the CPU has 16 control registers, each having 64 bit positions. The bit positions in the registers are assigned to particular facilities in the system, and are used either to specify that an operation can take place or to furnish special information required by the facility.

The control registers are identified by the numbers 0-15 and are designated by four-bit R fields in the instructions Load Control and Store Control. Multiple control registers can be addressed by these instructions. The Load Control (LCTLG) instruction causes all control register bit positions within those registers designated by the instruction to be loaded from storage. One example of control register 8 is depicted in FIG. 3.

Figure 3:
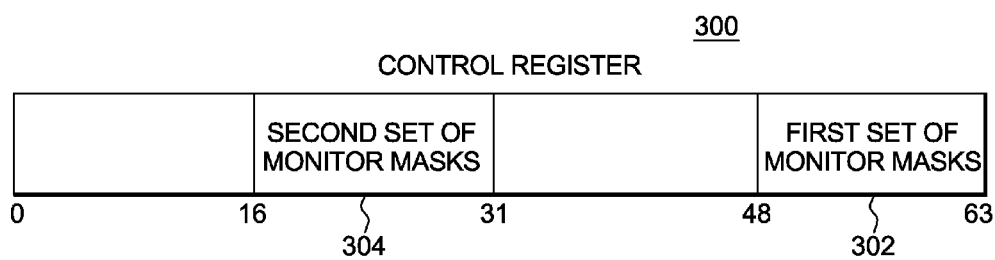
FIG. 3 depicts one example of a control register used in accordance with an aspect of the present invention.

With reference to FIG. 3, a control register 300 includes a first set of monitor masks 302, as well as a second set of monitor masks 304. In this particular embodiment, the first set of monitor masks is in bits 48-63 of the control register and is used in the prior existing monitoring facility, as well as in the enhanced facility, while the second set of monitor masks is in bits 16-31 and is used in the enhanced monitoring facility. Each set of masks includes, for instance, sixteen mask indicators (e.g., bits) corresponding to sixteen monitor classes. For each class to be monitored, its corresponding mask bit is set in the first set of monitor masks. For instance, if classes 3 and 7 are to be monitored, mask bits 3 and 7 are set in the first set of monitor masks. Further, each mask bit in the second set of monitor masks corresponds to its mask bit in the first set of monitor masks, and it is set if the enhanced facility is to be used. For instance, if classes 3 and 7 are to be monitored and the enhanced facility is to be used, then bits 3 and 7 in the first set and the second set of monitor masks are set (e.g., set equal to 1). In this example, the control program (e.g., operating system) sets the bits based on user input. Further, the classes are user defined and can represent any event to be monitored. They are established by the operating system. For instance, a class can be set up to count supervisor calls and the operating system will assign a particular class number to supervisor calls. The Monitor Call instruction is then inserted in a monitored program around supervisor calls and the $I_2$ field of the instruction is set to monitor that class. Any other desired events may also be assigned a class, and similarly monitored.

In the prior existing monitoring facility, when the Monitor Call instruction is executed, the monitor mask bit in the first set of monitor masks corresponding to the monitor class specified in bits 4-7 of the $I_2$ field is checked. If the bit is one, a monitor event program interruption occurs. The monitor code formed by the first operand address is placed in the doubleword at real memory location 176 (B0 Hex); the contents of the $I_2$ field are stored at real memory location 149 (95 Hex), with zeros stored at real memory location 148 (94 Hex); and bit 9 of the program interruption code is set to one.

Figure 4:
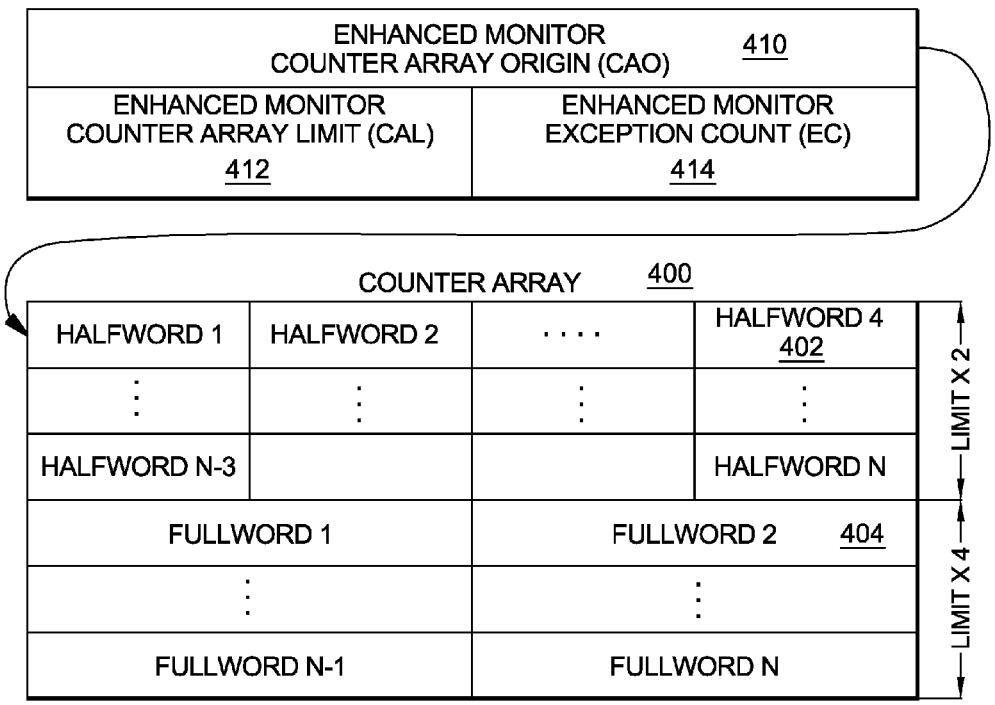
FIG. 4 depicts one example of a counter array and structures associated therewith, in accordance with an aspect of the present invention.

In accordance with an aspect of the present invention, an interrupt is not always taken when the monitor mask bit corresponding to the class specified by the $I_2$ field is one. Instead, millicode performs the monitoring without taking an interrupt. In performing this monitoring, a contiguous counter array is used. One example of this array is depicted in FIG. 4.

As shown, a counter array 400 includes a plurality of halfword entries 402 and a plurality of fullword entries 404. In one particular example, this array is 64 bytes, is stored in the home address space, and is initialized by the operating system. The halfword entries are in contiguous locations and take up an amount of space equivalent to an enhanced monitor counter array limit (a.k.a., limit)×2. The fullword entries are in contiguous locations immediately following the halfword entries and they take up an amount of space equivalent to the limit×4.

Further, in one example, the origin of the array is indicated by an enhanced monitor counter array origin 410, which is set by the operating system and stored, for instance, at real memory location 256 (100 Hex). Moreover, for processing of the enhanced monitoring facility, additional structures initialized by the operating system are used, including an enhanced monitor counter array limit 412 stored at real memory location 264 (108 Hex); and an enhanced monitor exception count 414 stored at location 268 (10C Hex).

One embodiment of the processing associated with the enhanced monitor facility is described with reference to FIGS. 5A-5B. In one example, it is firmware (e.g., millicode executing on a processor) that performs this logic.

Figure 5A:
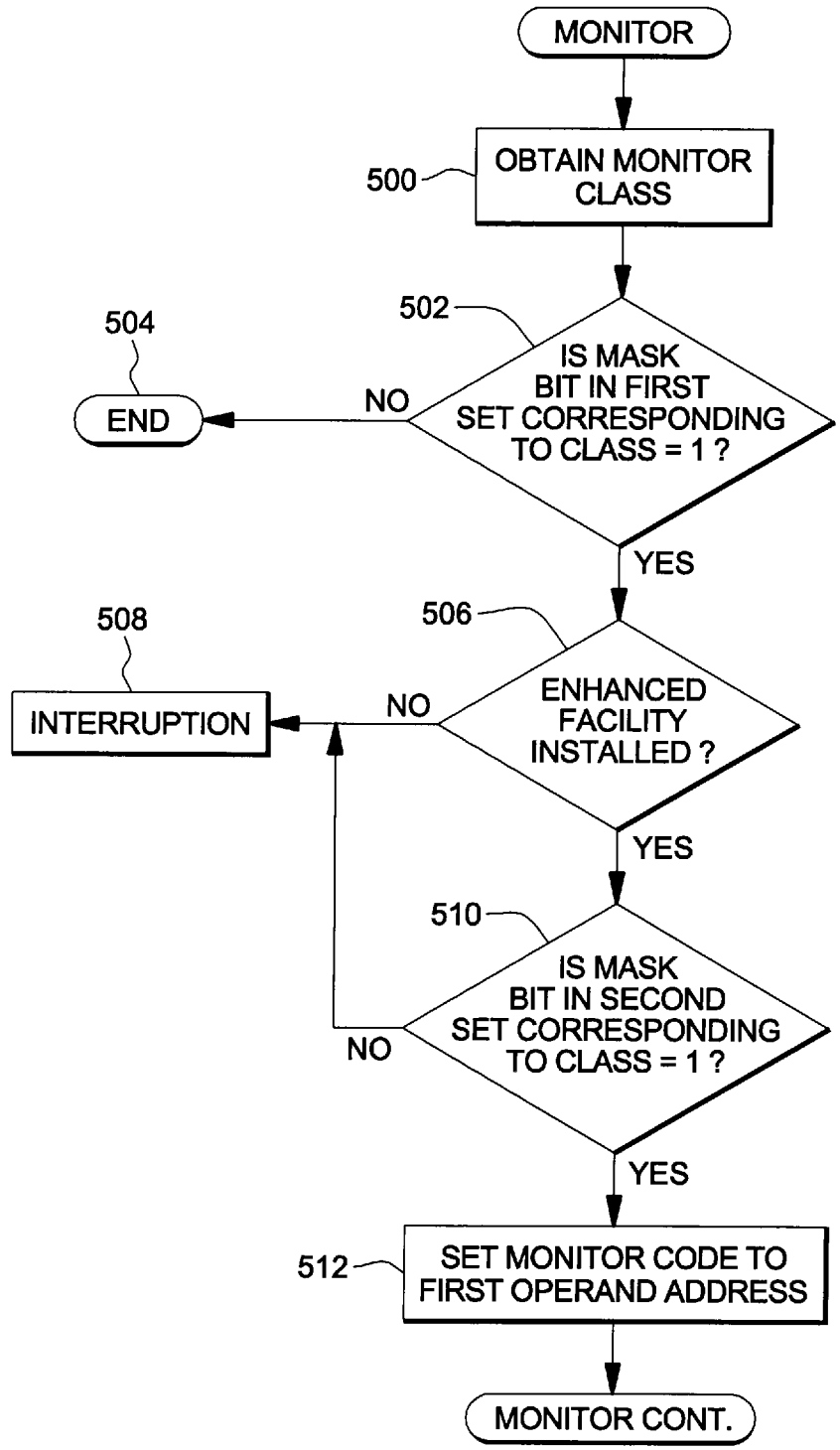
FIGS. 5A-5B depict one example of monitoring logic, in accordance with an aspect of the present invention.

Referring to FIG. 5A, initially, the monitor class is obtained from, for instance, the Monitor Call instruction, and in particular, bits 4-7 of the $I_2$ field of the instruction, STEP 500. Specifically, the $I_2$ field includes a 4-bit unsigned binary number, which represents a class to be monitored and forms an index into the 16 monitor masks in bits 48-63 of control register 8.

The mask bit in the first set of monitor masks (e.g., those in bits 48-63 of control register 8) pointed to by the $I_2$ field is checked. For instance, if the $I_2$ field includes a value of 3, representing class 3, then mask bit 3 in the first set of masks is checked. If its value is not equal to one, INQUIRY 502, then the instruction acts as a no-op and ends, STEP 504. However, if the specified mask bit (in the first set of monitor masks) is set to one, then processing continues with determining if the enhanced monitor facility is installed, INQUIRY 506. This determination may be made by checking an indicator or may be implied. If the enhanced monitor facility is not installed, then an interruption is taken, STEP 508. Thus, in this example, the monitor code formed by the first operand address (e.g., by adding the contents of the $B_1$ register to the contents of the $D_1$ field, referred to herein as $D_1(B_1)$ to obtain a value, which is the monitor code) is placed in the doubleword at real memory location 176 (B0 Hex); the contents of the $I_2$ field are stored at real memory location 149 (95 Hex), with zeros stored at real memory location 148 (94 Hex); and bit 9 of the program interruption code is set to one.

However, if the enhanced monitor facility is installed, INQUIRY 506, then a further determination is made as to whether the corresponding mask bit in the second set of monitor masks (e.g., bits 16-31 of CR 8) is equal to one, INQUIRY 510. For instance, if mask bit 3 in the first set of monitor masks is checked, then mask bit 3 in the second set of monitor masks is checked. If the specified mask bit in the second set of monitor masks is not set (e.g., equal to zero), then an interruption is taken and processing proceeds as described above, STEP 508. Otherwise, a monitor event counting operation is performed, as follows.

Figure 5B:
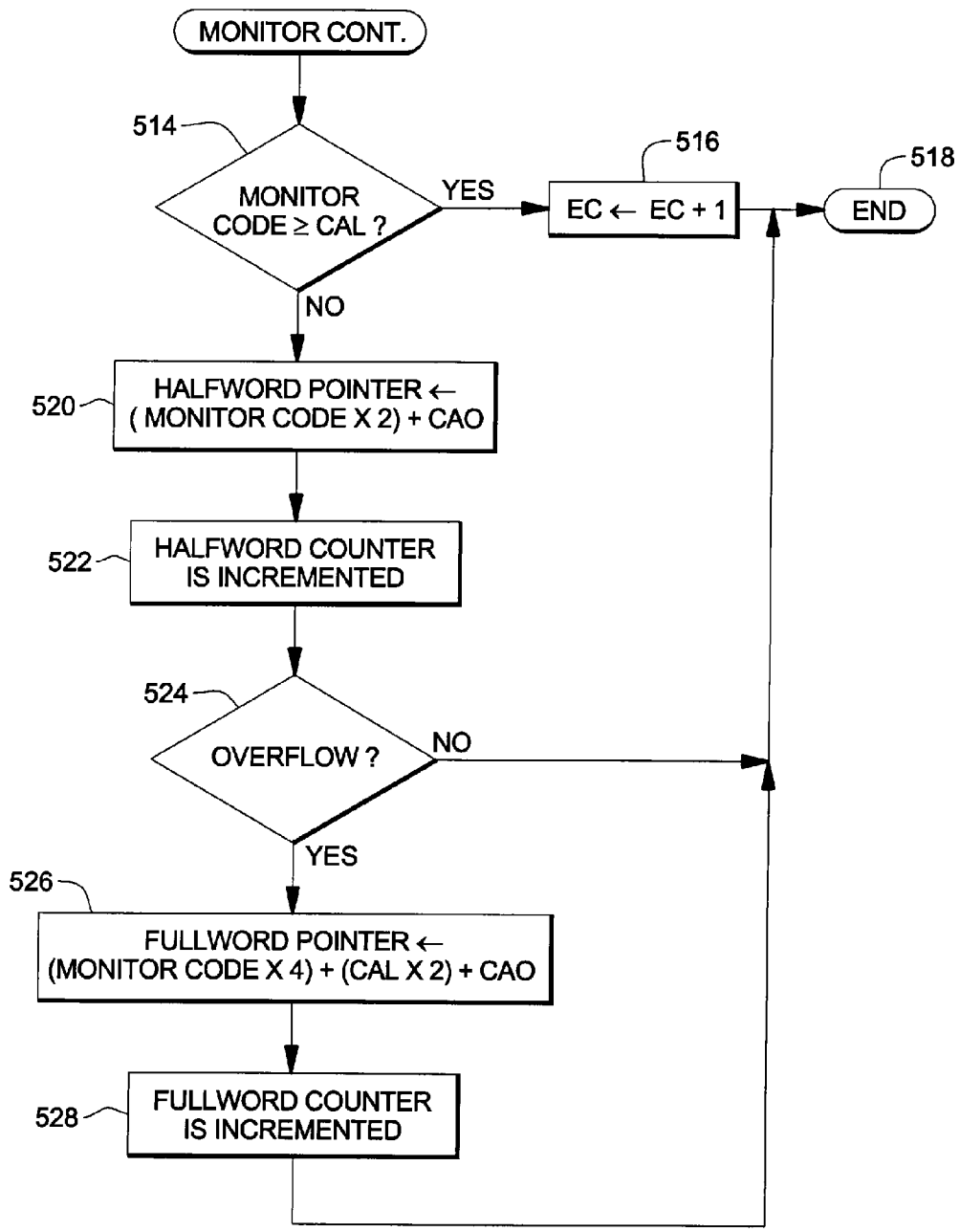

Initially, the monitor code is set to the first operand address of $D_1(B_1)$, STEP 512, and a determination is made as to whether the monitor code is greater than or equal to the enhanced monitor counter array limit, INQUIRY 514 (FIG. 5B). Specifically, in one example, the enhanced monitor counter array size (or limit) contained in the word at real memory location 264 (108 Hex), extended on the left with 32 binary zeros, is logically compared with the monitor code formed by the first operand address. If the monitor code is greater than or equal to the enhanced monitor counter array limit, INQUIRY 514, then one is logically added to the enhanced monitor exception count contained in the word at real memory location 268 (10C Hex), STEP 516, and the instruction completes, STEP 518. Any carry as a result of this addition is ignored.

Returning to INQUIRY 514, if the monitor code is less than the enhanced monitor counter array limit (extended on the left with 32 zeros), then one is added to the enhanced monitor counter corresponding to the monitor code. An enhanced monitor counter includes two discontiguous storage locations: an unsigned halfword, which is incremented first, and an unsigned word (a.k.a., fullword), which is incremented whenever a carry out of bit position 0 of the halfword addition occurs. This is described in further detail below.

The enhanced monitor counter array origin in bits 0-60 of the doubleword at real memory location 256 (100 Hex), appended on the right with three binary zeros, forms the 64-bit virtual address of the enhanced monitor counter array in the home address space. The enhanced monitor counter array size field at real memory location 264 (108 Hex) specifies the number of halfword and word entries in the array; the halfword entries in the array appear first, followed immediately by the word entries.

The monitor code multiplied by two is added to the enhanced monitor counter array origin to form the virtual address of a halfword, which is used as a pointer to the desired halfword entry, STEP 520. One is then logically added to the contents of the halfword entry specified by the halfword pointer, STEP 522. If this addition results in a carry out of bit position 0 of the halfword, INQUIRY 524, then one is logically added to the corresponding word. That is, the enhanced monitor counter array size value multiplied by two is added to the monitor code multiplied by four; this value is added to the enhanced monitor counter array origin to form the address of the word, which is used as a pointer to the word entry corresponding to the halfword entry, STEP 526. One is then logically added to the contents of the word entry specified by the word pointer, STEP 528. This concludes processing.

Described in detail above is an enhanced monitoring facility that retains compatibility with a prior existing monitoring facility. In response to execution of the Monitor Call instruction, either an interruption is taken (existing facility) or the CPU firmware updates counters absent an interrupt or intervention by the operating system or application program (enhanced facility). The enhanced facility allows counter arrays to be maintained in the home address space, which provides wider scope of counters, an increase in counter range, and separate 2-bit and 4-bit counters which improves cache utilization; it allows the updating of counters be performed by millicode, which is more efficient than a path through the operating system program interruption handler; and it provides an exception counter, which eliminates the need for program specified exception handling (e.g., assuming array address and limit are properly established, out-of-bounds and addressing exceptions handled by millicode). The enhanced facility enables the invoking of a counting technique that is based on user-defined counter locations, as opposed to hard-wired counters.

The Monitor Call instruction is an instruction of a computer program, and the execution of the instruction uses a machine instruction defined class to identify an event. The instruction is operable in two modes: a first mode—an interrupt mode and a second mode—a non-interrupt mode. Responsive to the computing environment being in the second mode (non-interrupt mode) and encountering the event identified by the instruction, a counter (memory location) is incremented, and processing proceeds to executing a next instruction of the computer program. Responsive to the computing environment being in the first mode and having encountered the event identified by the instruction, an interrupt is taken from the computer program to an interrupt handler routine without incrementing the counter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
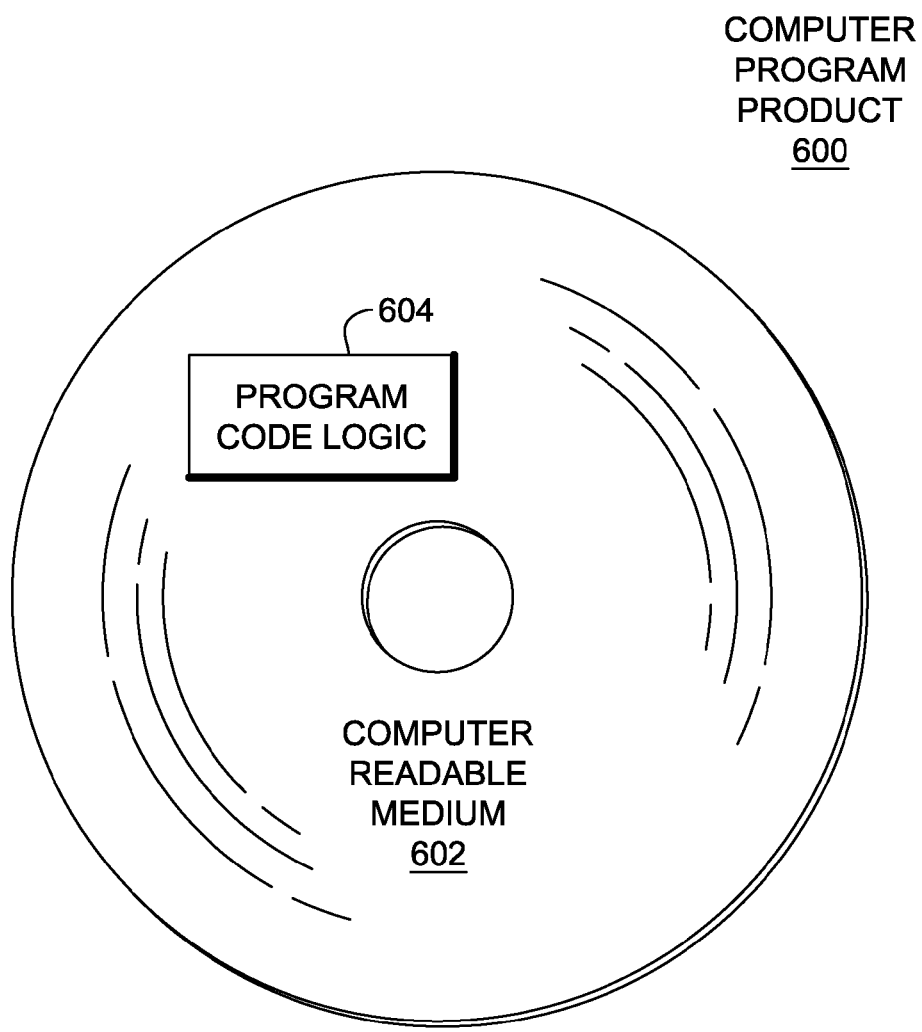
FIG. 6 depicts one embodiment of a computer program product incorporating one or more aspects of the present invention.

Referring now to FIG. 6, in one example, a computer program product 600 includes, for instance, one or more computer readable media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, other processors and/or operating systems may be used. Additionally, although specific bits, bytes, op codes and/or locations are described herein, these are only examples. Many variations exist without departing from the spirit of the present invention. Further, the counter array may have a different structure and/or size. Yet further, there may be more or less masks and indicators other than bits may be used. Also, there may be more or less classes, and the examples provided herein are only examples. Other and/or different events may be assigned classes and monitored, including, but not limited to, instructions, memory allocations, and other types of events. The monitoring can perform tasks other than counting. Further, the particular actions taken during an interrupt or in monitoring can differ from those described herein.

Moreover, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating monitoring in a computing environment, the computer program product comprising:
   a non-transitory storage medium readable by a processing circuit and storing instructions for execution by the processing circuit for performing a method comprising:
      executing a machine instruction to monitor an event of the computing environment, said machine instruction being operable in a first mode of operation and a second mode of operation, said executing comprising:
         specifying, by the machine instruction, the event to be monitored;
         selecting any one of the first mode of operation or the second mode of operation, wherein the first mode of operation is configured to take an interrupt and the second mode of operation is configured to increment a counter associated with the event being monitored absent taking the interrupt;
         based on selecting the second mode of operation:
            comparing a value of a monitor code and a limit of a counter array, said counter array including said counter;
            based on the comparing providing a first result, incrementing the counter of the counter array absent taking the interrupt; and
            based on the comparing providing a second result, incrementing an exception count.

2. The computer program product of claim 1, wherein the selecting any one of the first mode of operation or the second mode of operation selects the second mode of operation based on a first mask indicator and a second mask indicator being set, in which the counter is incremented without taking the interrupt, and the selecting any one of the first mode of operation or the second mode of operation selects the first mode of operation based on the first mask indicator being set and the second mask indicator not being set, in which the interrupt is taken without incrementing the counter.

3. The computer program product of claim 1, wherein the first result comprises the value of the monitor code being less than the limit, and the second result comprises the value of the monitor code being greater than or equal to the limit.

4. The computer program product of claim 1, wherein the counter array comprises a plurality of halfword entries followed by a plurality of fullword entries.

5. The computer program product of claim 4, wherein the counter is located in a halfword entry of the counter array identified by a halfword pointer, and based on an overflow condition of the halfword entry, the counter is further located in a fullword entry of the counter array specified by a fullword pointer.

6. The computer program product of claim 5, wherein the halfword pointer is set to (the value of the monitor code×2)+ an origin of the counter array, and the fullword pointer is set to (the value of the monitor code×4)+(the limit×2)+the origin.

7. The computer program product of claim 1, wherein the selecting any one of the first mode of operation or the second mode of operation comprises:
checking a first mask indicator in a first set of monitor masks;
based on the checking indicating the first mask indicator is set, checking a second mask indicator in a second set of monitor masks, said second mask indicator corresponding to the first mask indicator; and
based on the checking the second mask indicator indicating the second mask indicator is set, selecting the second mode of operation, otherwise, selecting the first mode of operation.

8. The computer program product of claim 7, wherein the method further comprises selecting the first mask indicator to be checked, the selecting the first mask indicator to be checked being based on a value in an index field of the machine instruction.

9. The computer program product of claim 1, wherein the machine instruction comprises a Monitor Call instruction, said Monitor Call instruction comprising an operation code designating the Monitor Call instruction, an index field specifying a class to be monitored, and a first operand field specifying the value of the monitor code usable during processing of the machine instruction.

10. The computer program product of claim 9, wherein the operation code is in bits 0-7 of an instruction format of the Monitor Call instruction, the index field is in bits 8-15, and the first operand field is in bits 16-31, the first operand field comprising a base portion in bits 16-19 and a displacement portion in bits 20-31.

11. A computer system for facilitating monitoring in a computing environment, the computer system comprising:
a memory; and
a processor in communications with the memory, wherein the computer system is configured to perform a method, said method comprising:
executing a machine instruction to monitor an event of the computing environment, said machine instruction being operable in a first mode of operation and a second mode of operation, said executing comprising:
specifying, by the machine instruction, the event to be monitored; and
selecting any one of the first mode of operation or the second mode of operation, wherein the first mode of operation is configured to take an interrupt and the second mode of operation is configured to increment a counter associated with the event being monitored absent taking the interrupt;
based on selecting the second mode of operation:
comparing a value of a monitor code and a limit of a counter array, said counter array including said counter;
based on the comparing providing a first result, incrementing the counter of the counter array absent taking the interrupt; and
based on the comparing providing a second result, incrementing an exception count.

12. The computer system of claim 11, wherein the selecting any one of the first mode of operation or the second mode of operation selects the second mode of operation based on a first mask indicator and a second mask indicator being set, in which the counter is incremented without taking the interrupt, and the selecting any one of the first mode of operation or the second mode of operation selects the first mode of operation based on the first mask indicator being set and the second mask indicator not being set, in which the interrupt is taken without incrementing the counter.

13. The computer system of claim 11, wherein the counter array comprises a plurality of halfword entries followed by a plurality of fullword entries, and wherein the counter is located in a halfword entry of the counter array identified by a halfword pointer, and based on an overflow condition of the halfword entry, the counter is further located in a fullword entry of the counter array specified by a fullword pointer.

14. A computer program product for facilitating monitoring in a computing environment, the computer program product comprising:
a non-transitory storage medium readable by a processing circuit and storing instructions for execution by the processing circuit for performing a method comprising:
executing a Monitor Call instruction, the Monitor Call instruction to be placed at one or more points in a monitored program and configured to include an operation code to specify the Monitor Call instruction, an index field to specify a class to be monitored, and at least one field to be used to form a monitor code, the monitor code to be used in execution of the Monitor Call instruction, said executing comprising:
checking a first set of monitor masks to determine whether a first selected mask of the first set of monitor masks is set to a first particular value, the first selected mask corresponding to a value of the index field;
based on the first selected mask being set to the first particular value, checking a second set of monitor masks to determine whether a second selected mask of the second set of masks is set to a second particular value, the second selected mask corresponding to the value of the index field;
based on the checking the first set of monitor masks indicating the first selected mask is set to the first particular value and the checking the second set of monitor masks indicating the second selected mask is set to the second particular value, performing a monitor event counting operation, the performing comprising:
forming the monitor code using the at least one field of the Monitor Call instruction;
comparing the monitor code formed from the at least one field of the Monitor Call instruction to a predetermined value; and
based on the comparing providing a first result, updating a counter corresponding to the monitor code absent taking an interrupt.

15. The computer program product of claim 14, wherein the predetermined value being compared comprises a limit of a counter array, the counter array including the counter, and the first result comprises the monitor code being less than the limit.

16. The computer program product of claim 15, wherein based on the comparing providing a second result, incrementing an exception count, the second result comprising the monitor code being greater than or equal to the limit.

17. The computer program product of claim 15, wherein the counter array comprises a plurality of halfword entries followed by a plurality of fullword entries.

18. The computer program product of claim 17, wherein the counter is located in a halfword entry of the counter array identified by a halfword pointer, and based on an overflow condition of the halfword entry, the counter is further located in a fullword entry of the counter array specified by a fullword pointer.

19. The computer program product of claim 18, wherein the halfword pointer is set to (the monitor code×2)+an origin of the counter array, and the fullword pointer is set to (the monitor code×4)+(the limit×2)+the origin.

20. The computer program product of claim 14, wherein the at least one field comprises a first field and a second field, and wherein the forming the monitor code comprises adding contents of a register designated by the first field with contents of the second field to form the monitor code.

* * * * *